United States Patent
Hirneise

(10) Patent No.: US 10,919,371 B2
(45) Date of Patent: Feb. 16, 2021

(54) VEHICLE ROOF SYSTEM

(71) Applicant: Paul Hirneise, Gainesville, FL (US)

(72) Inventor: Paul Hirneise, Gainesville, FL (US)

(*) Notice: Subject to any disclaimer, the term of this patent is extended or adjusted under 35 U.S.C. 154(b) by 63 days.

(21) Appl. No.: 16/515,398

(22) Filed: Jul. 18, 2019

(65) Prior Publication Data
US 2021/0016645 A1    Jan. 21, 2021

(51) Int. Cl.
*B60J 7/16* (2006.01)
*B60J 7/10* (2006.01)
*B60J 7/08* (2006.01)
*B60J 7/14* (2006.01)

(52) U.S. Cl.
CPC .............. *B60J 7/1657* (2013.01); *B60J 7/08* (2013.01); *B60J 7/108* (2013.01); *B60J 7/143* (2013.01)

(58) Field of Classification Search
CPC ....... B60J 7/08; B60J 7/10; B60J 7/106; B60J 7/108; B60J 7/11; B60J 7/143; B60J 7/1628; B60J 7/1635; B60J 7/1642; B60J 7/1657
USPC ..... 296/136.01, 216.01, 216.02, 219, 220.01
See application file for complete search history.

(56) References Cited

U.S. PATENT DOCUMENTS

| | | | |
|---|---|---|---|
| 4,217,970 A | 8/1980 | Chika | |
| 4,336,964 A | 6/1982 | Pivar | |
| 5,058,863 A | 10/1991 | Maffet | |
| 5,094,313 A | 3/1992 | Mauws | |
| 6,547,304 B1 | 4/2003 | Conner | |
| 9,428,227 B2 | 8/2016 | Jones et al. | |
| 9,988,832 B2 | 6/2018 | Hirneise | |
| 2006/0254024 A1 | 11/2006 | Yong | |
| 2011/0047754 A1 | 3/2011 | Takahashi | |
| 2013/0199097 A1 | 8/2013 | Spindler et al. | |

*Primary Examiner* — Jason S Daniels
(74) *Attorney, Agent, or Firm* — Sven W Hanson

(57) ABSTRACT

A vehicle enclosure includes a roof element that rotates upward from the occupant space to increase the passenger opening and increase ease of entry. The roof element is secured to and rotates about a horizontal vehicle frame element. The roof element also supports a windshield at the upper edge of the windshield during travel. The horizontal frame element is formed of a rigid tubular cross-section member including tubular hinge elements to which the roof element is secured to enable the rotating action of the roof element.

4 Claims, 4 Drawing Sheets

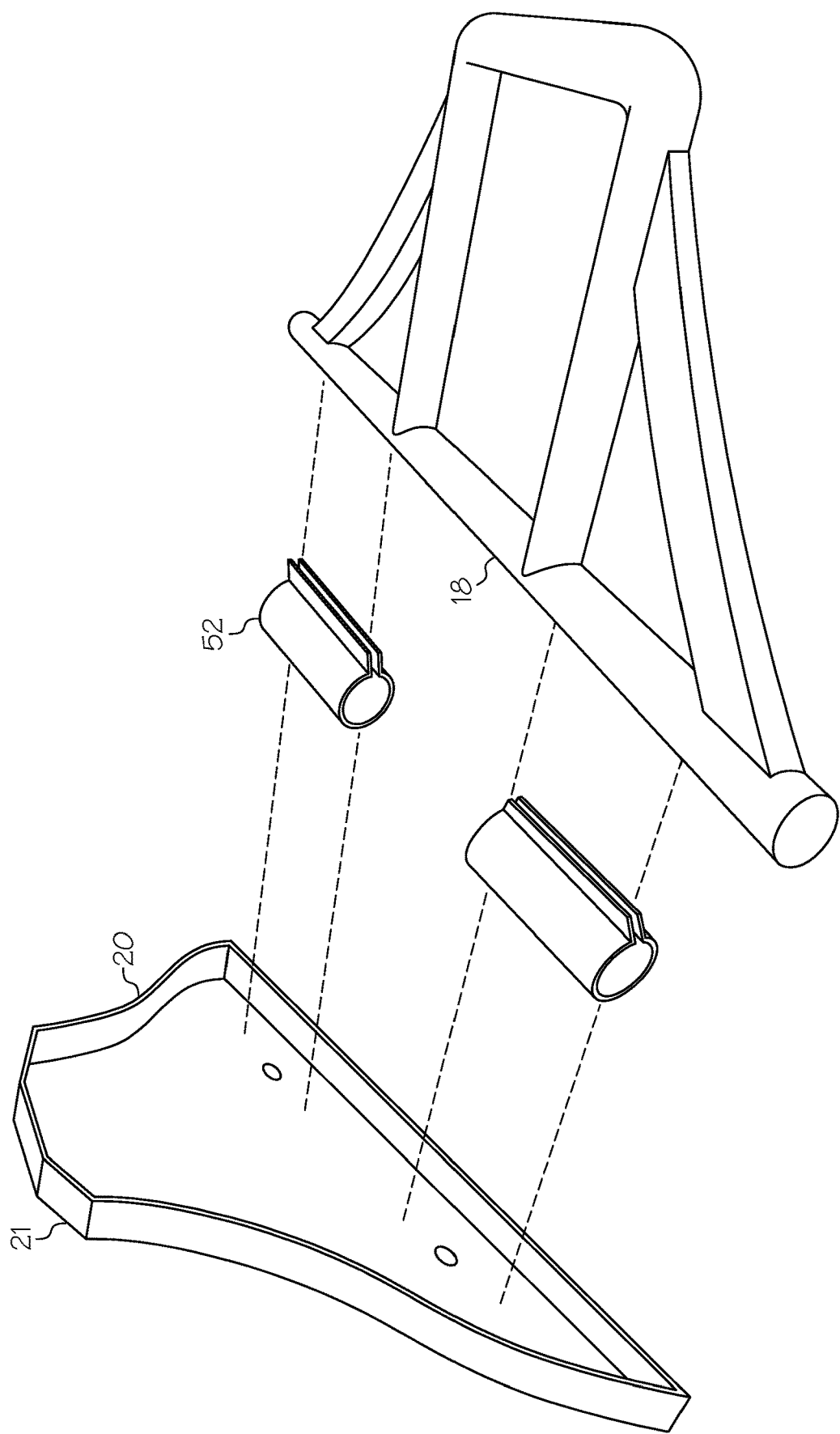

VEHICLE ROOF SYSTEM

BACKGROUND

The present invention pertains to passenger vehicles and enclosure elements for vehicle occupant compartments. In particular, the invention regards modular enclosure designs and systems for otherwise "open" vehicles wherein the occupant compartment or space is not entirely enclosed. Example associated vehicles are those combining features and aspects of motorcycles and open automobiles, for example the three-wheeled motorized vehicles marketed by Polaris Industries of Medina, Minn., USA.

SUMMARY OF THE INVENTION

The invention includes a vehicle enclosure having a subroof element that rotates upward from a vehicle occupant space to increase the passenger opening and increase ease of entry. The subroof is secured to and rotates about a horizontal vehicle frame element. The subroof also supports, by simple contact, a vehicle windshield at the upper perimeter edge of the windshield during travel of the vehicle. The horizontal frame element preferably is formed of a rigid tubular cross-section member including tubular hinge elements to which the subroof is secured to enable the rotating action of the subroof element.

Roof cover panels may optionally be combined to increase the enclosure area. In one configuration, a forward roof panel is removably secured to the subroof and rotates with the subroof.

The roof panels are preferably removable by use of manually applied fasteners. The roof panels may be segmented with a forward roof panel secured to the subroof and operable in the manner discussed above, and a rear roof panel which may be removable. Preferably the roof panels are configured to allow temporary storage of the forward roof panel over the rear roof panel.

Other novel aspects of the invention are made clear in the following description of embodiments of the invention and the accompanying drawing figures. However, the invention is not intended to be limited to or by these specific embodiments and other forms of the invention will be obvious to those skilled in the art.

DESCRIPTION OF THE DRAWINGS

FIG. 4 is a depiction of the configuration of FIG. 3 in an alternative view angle and with the hinge components separated for illustration.

DETAILS OF EMBODIMENTS OF THE INVENTION

FIGS. 1 to 4 illustrate various views and configurations of the invention. References to specific structural elements and indicative numbering apply equally to all figures. The invention regards a conventional vehicle 100 having an occupant space 99. This space in is typically identified by seat structures to accept a human driver and passengers in some attitude of repose. The space may be partially enclosed by a vehicle body and may be partially open to the surrounding environment. The conventional operable elements of the vehicle such as motor, wheels, suspension, etc. are supported and interconnected in part by a conventional structural frame, not entirely illustrated here.

Figure 1:
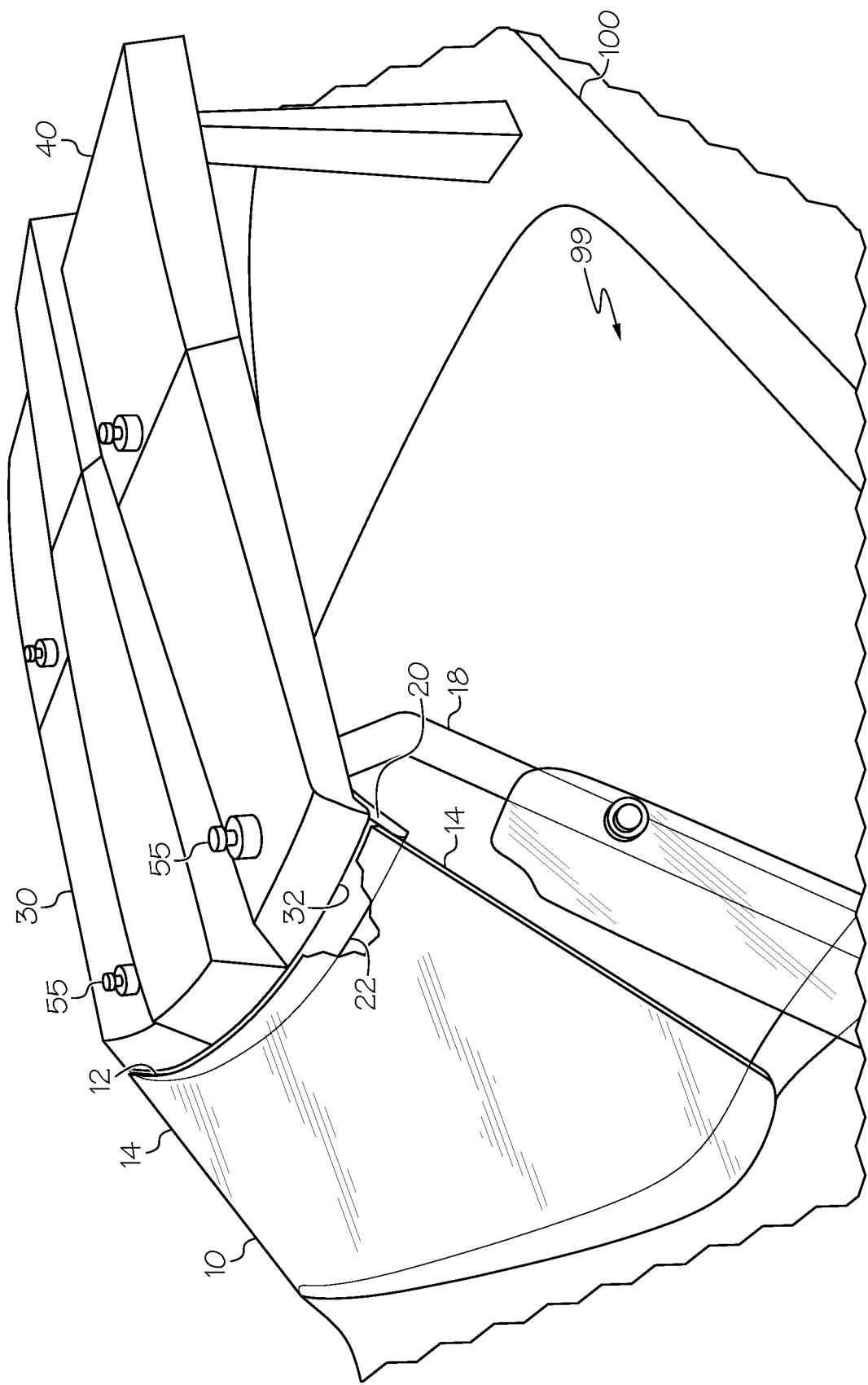
FIG. 1 is an isometric view of one embodiment of the inventive roof system.
Figure 2:
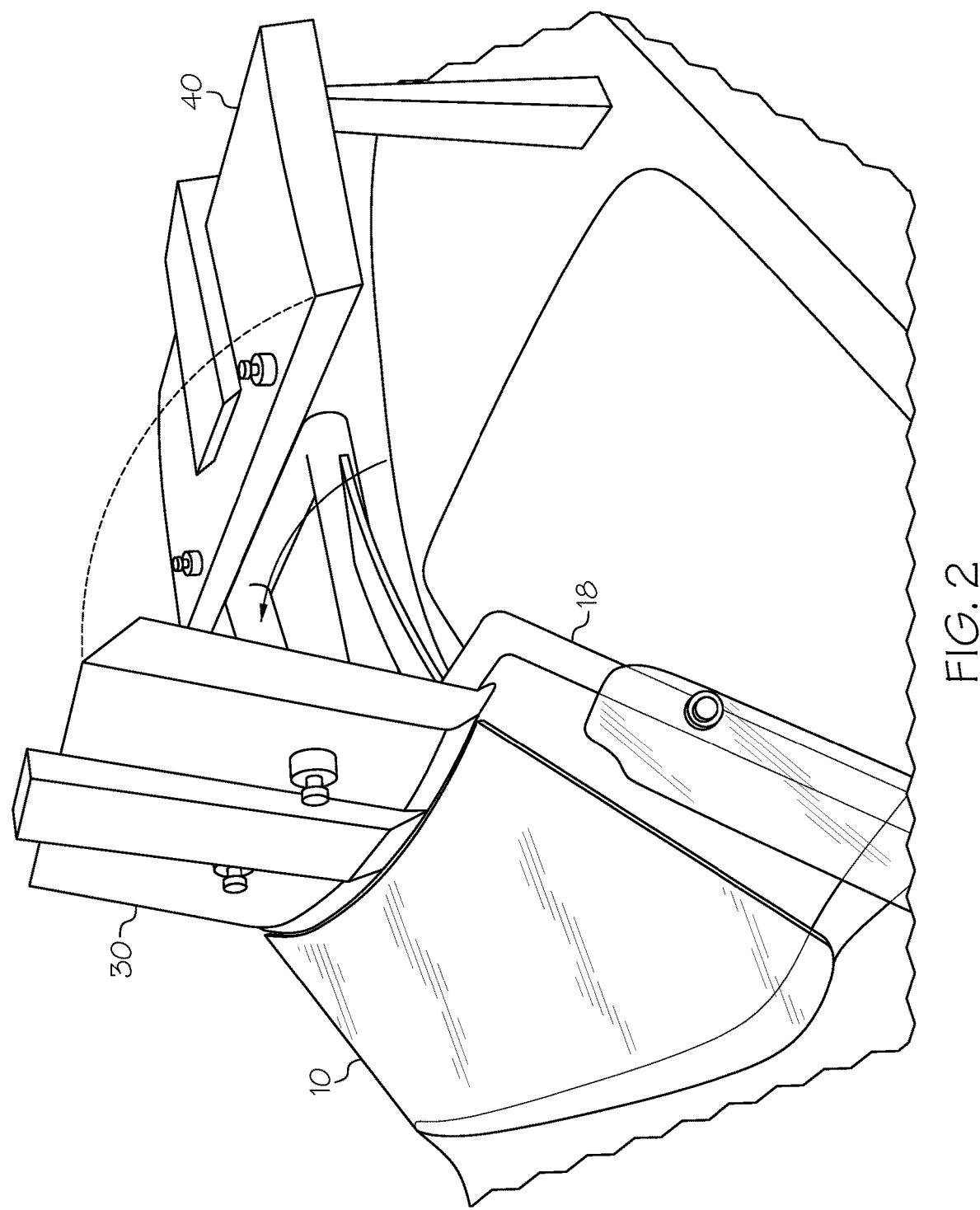
FIG. 2 is an isometric view of the configuration of FIG. 1 with a forward roof element removed to view a subroof element.
Figure 3:
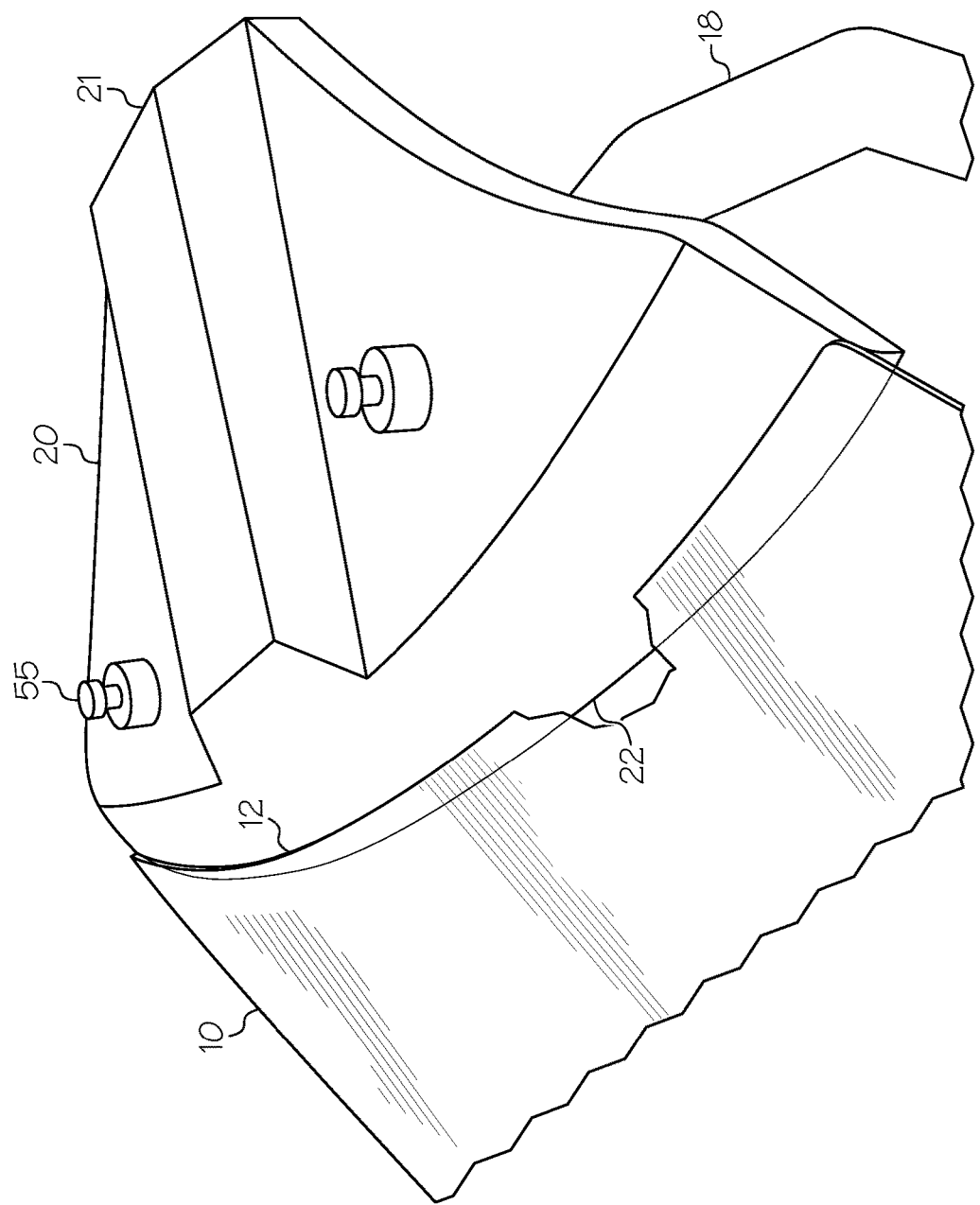
FIG. 3 is an isometric view of the configuration of FIG. 1 in which a roof panel is in a rotated condition.

FIG. 1 illustrates a configuration of the invention including a forward roof panel 30 that is removably secured to a subroof element 20. Both are supported, together, on a vehicle frame horizontal element 18 as described below. In FIGS. 1 and 2, the forward roof panel 30 is located on top of and substantially obscures from view the subroof 20. A rear roof panel 40 is secured to the vehicle in a location rearward of the forward roof panel 30 and is configured to engage the forward roof panel 30 in one condition to form an enclosure roof. In FIG. 3, the forward roof panel 30 is removed to expose the subroof element 20. In all conditions discussed, the forward roof panel 30 may be, alternatively, removed from or located on the subroof element 20.

The invention includes a windshield 10. The construction and requirements of the windshield 10 are generally those of conventional automobile vehicle windshields including being transparent and located to enable operator vision of the vehicle path from the occupant space. In the invention, the windshield 10 is secured at its bottom edge to the vehicle (via the vehicle frame or body). The windshield 10 extends generally upward and rearward from its bottom edge and has an opposing upper perimeter edge 12. The upper perimeter edge 12 is preferably not permanently fixed to any vehicle structure. The windshield 10 preferably extends to both lateral sides of the vehicle, to respective side terminal ends 14, such that the windshield 10 deflects passing air, in travel movement of the vehicle, directing the air around the occupant space. The perimeter edge 12 extends entirely from one terminal end 14 to the other terminal end 14. Herein, reference to relative spacial locations such as "forward" or "rearward" are defined with respect to the associated vehicle orientation: normal travel movement of the vehicle defining a forward direction.

The vehicle frame includes a horizontal member 18 that traverses across the vehicle, in a configuration behind and adjacent the windshield 10 along the entire upper perimeter edge 12. The figures illustrate a particular supporting structure for the horizontal member 18, but this is not critical and the shape and design of the horizontal member supporting structure may be modified to adapt to the esthetics and other demands of the vehicle design.

The subroof element 20 is secured to the horizontal member 18 to allow rotation of the subroof 20 about an axis at or near a center longitudinal axis of the horizontal member 18 (transverse to the vehicle longitudinal centerline).

The subroof 20 may be formed of a rigid sheet panel, preferably formed of a moldable sheet material, such as sheet metal or ABS (Acrylonitrile butadiene styrene) thermo plastic polymer or the like. The subroof 20 extends forward of the horizontal member 18 to terminate at a subroof forward edge 22 that is located, sized and shaped to contact and mate to the rear and underside surface of the windshield 10 at the upper perimeter edge 12. The subroof forward edge 22 should extend over substantially the entire extent of the upper perimeter edge 12 to support the windshield 10 against rearward directed wind forces during travel. The subroof 20 is not secured to the windshield 10 by any fasteners or other device or mechanism and the subroof 20 is free at all times to separate from the windshield 10 upon rotation of the subroof 20. In FIGS. 1 and 3, the perimeter edge 12 is illustrated partially cut-away to illustration the under-lying forward edge 22 of the subroof 20.

The subroof 20 and its connection to the horizontal member 18 must enable the subroof 20 to be positioned, via continous rotation, in at least two different conditions. The first condition is as described above with the subroof forward edge 22 contacting and supporting the windshield upper perimeter edge 12. In this condition, the subroof 20 is generally horizontal and extends also rearward from the horizontal member 18 to partially cover the occupant space. The subroof 20 may include locking devices or mechanisms (not shown) to temporarily secure the subroof 20 against rotation while in the first condition.

In a second condition, the subroof 20 is rotated (while unlocked) so that the rearward subroof portion 21, rearward of the horizontal member 18, is rotated substantially upward, away from the occupant space. In this manner, additional open space is provided for persons to enter and leave the occupant space. At the same time, as a consequence of this rotation, the forward edge 22 is rotated away from the windshield 10 to separate the forward edge 22 from the windshield upper perimeter edge 12. In this condition, the upper perimeter edge 12 is unsupported. For the purposes here, enhance user entrance and exit, a rotation of the subroof 20 (between the two conditions) of at least 30 degrees and more preferably at least 60 degrees is required.

Except as specified here, the shape and construction of the subroof 20 may take various different forms and may be altered to provide different areas of shade and protection from the environment to the occupant space and to accommodate other structures.

In various configurations, the invention includes two roof portions, a forward roof panel 30 and a rear roof panel 40. Both may be, in different configurations, alternatively permanently fixed in place or removable. The rear roof panel 40 is optional and may be not included in various configurations of the inventive device, but is preferred included as providing a beneficial value in combination with the forward roof panel 30. The forward roof panel 30 is removably secured above and to the subroof 20 and extends from the upper perimeter edge 12 and rearward to the rear roof panel 40. Preferably, the forward roof panel 30 and rear roof panel 40 overlap or engage when in place to create a waterproof continuous barrier. Construction of the forward roof panel 30 and the rear roof panel 40 is substantially the same as that described above for the subroof 20.

While it is preferred that the subroof 20 and forward roof panel 30 are not connected to the windshield 10 except by contact—for ease of use of the roof—much of the benefits of the invention will be appreciated in a roof system in which roof elements are releasably secured to the windshield. For example, to improve protection from water intrusion a releaseable securing seal or securing mechanism may be used to temporarily join the roof to the windshield 10.

When secured to the subroof 20, the forward roof panel 30 rotates with the subroof 20 in the different conditions. In the second condition, forward leading edge 32 of the forward roof panel 30 rotates downward relative to the windshield 10 and separates from it. For this reason, the leading edge 32 must not extend forward of, beyond, the upper perimeter edge 12.

In alternative configurations, the subroof 20 and the forward roof panel 30 may be an integrated structure, or the subroof 20 alone may provide the entire structure and function of the forward roof panel 30.

The above rotation of the subroof 20 is enabled by a tube hinge formed by the combination of a circular cross-section shape of the horizontal member 18 and a slotted hinge tube 52 as seen in FIG. 4. The hinge tube 52 is preferably formed of a resilient material such as rigid PVC (polyvinylchloride) or unfilled or filled ABS (substantially acrylonitrile-butadiene-styrene) plastic in tubular form that has been cut or formed to introduce a full-length longitudinal slot which allows the effective diameter of the hinge tube 52 to be adjusted with force.

The hinge tube 52 is pivotably located about the horizontal member 18, the horizontal member 18 passing longitudinally through the hinge tube 52. By proper selection of size and material of the hinge tube 52, the hinge tube 52 can support the roof elements in a number of different rigid configurations—by rotating the hinge tube 52 and roof elements, together, about the horizontal member 18.

The inner diameter dimension the hinge tube 52, separate from the horizontal member 18, is slightly smaller (in the prejoined unstressed state) than the outer diameter of the horizontal member 18. Expressed in other terms, the horizontal member 18 resides in the hinge tube 52 with an interference fit such that the larger diameter of the horizontal member 18 maintains an outward displacement of the hinge tube 52 thereby inducing stress in the hinge tube 52 and reacting force against the surface of the horizontal member 18. The resilient nature of the material of the hinge tube 52 results in that the hinge tube 52 is biased continuously into a more closed (smaller diameter) condition, such as to maintain a forced contact and consequent friction with the horizontal member 18. This biasing may also be produced by any of a number of clamping methods or devices.

Once engaged with the horizontal member 18, the inward biasing force of hinge tube 52 to close onto the horizontal member 18 provides a friction force resisting rotation of the hinge tube 52 on the horizontal member 18. This static friction force is preferably greater than the resulting torque force of the attached roof elements when at all use conditions. In this manner, external or secondary supports for the roof elements are not necessary. For this requirement, the hinge tube 52 must have sufficient longitudinal length, the specifics of which may be determined on an ad hoc basis.

The desired function of the hinge tube 52 requires that no fasteners or fastening mechanism join or interconnect the hinge tube 52 and the horizontal member 18. That is, these two elements have a sliding interrelationship that allows the rotational movement of the hinge tube 52. In the configuration shown, two hinge tubes 52 are used. However, depending on the width and stiffness of the roof element and other factors, one or more than two hinge tubes 52 may be used—the specific number not being critical.

Conventional threaded fasteners may be used to secure the roof elements to the hinge tube 52. Preferably the fasteners are configured to be alternatively secured and removed without the use of tools—by solely manual effort. In the figures, manual threaded fasteners 55 with human grip-size covers are illustrated.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that m ight cooperatively provide a collection of benefits. The present invention is not limited to only those embodiments that include all of these features or that provide all of the stated benefits, except to the extent otherwise expressly set forth in the issued claims. Any reference to elements in the singular, for example, using the articles "a," "an," "the" or "said," is not to be construed as limiting the element to the singular.

The invention claimed is:

1. An enclosure system for a vehicle having a human occupant space, the enclosure system comprising:
    a windshield; the windshield having an upper perimeter edge;
    a vehicle frame horizontal member, the horizontal member located adjacent and rearward to the windshield upper perimeter edge;
    a subroof element pivotably secured to the horizontal member and extending forward from the horizontal member to a subroof forward leading edge and extending rearwardly from the horizontal member;
    wherein in a first condition the forward leading edge is in contact with, and resists rearward movement of, the windshield at the upper perimeter edge, and in a second condition the subroof is rotated such that the forward leading edge is located downward and away from the upper perimeter edge.

2. An enclosure system, according to claim 1, and further comprising:
    a roof forward panel removeably secured to the subroof.

3. An enclosure system, according to claim 2, and further comprising:
    a roof rear panel secured to the vehicle frame; the roof rear portion configured to engage with the roof forward panel in the first condition.

4. An enclosure system, according to claim 1, and wherein:
    the horizontal member has a circular cross-section form and includes at least two hinge tubes disposed rotatably on the horizontal member;
    the subroof secured to the hinge tubes.

* * * * *